United States Patent [19]

Cottier et al.

[11] 4,041,188

[45] Aug. 9, 1977

[54] FOOD COMPOSITION

[75] Inventors: Derek Cottier, London; John Barry Rossell, Loughton, both of England

[73] Assignee: Lever Brothers Company, New York, N.Y.

[21] Appl. No.: 598,454

[22] Filed: July 23, 1975

[30] Foreign Application Priority Data

July 26, 1974 United Kingdom ............... 33176/74
July 26, 1974 United Kingdom ............... 33175/74

[51] Int. Cl.² .............................................. A23D 5/00
[52] U.S. Cl. ................................................. 426/607
[58] Field of Search .................... 426/606, 607, 601; 260/398, 405.5, 409

[56] References Cited

U.S. PATENT DOCUMENTS

| | | | |
|---|---|---|---|
| 2,972,541 | 2/1961 | Cochran et al. ................. | 426/606 X |
| 2,975,063 | 3/1961 | Paul et al. ............................ | 426/607 |

*Primary Examiner*—Raymond N. Jones
*Assistant Examiner*—R. A. Yoncoskie
*Attorney, Agent, or Firm*—James J. Farrell; Kenneth F. Dusyn; Melvin H. Kurtz

[57] ABSTRACT

Confectionery fat of improved melting and bloom-resistant characteristics comprises a blend of selectively hydrogenated $C_{16}$–$C_{18}$ palmitic and non-palmitic fats, especially blends of separately hydrogenated components containing more than 50% of the palmitic component. Suitable palmitic fats include palm and cottonseed oils. Liquid vegetable oils such as soyabean and groundnut oil may be used as the non-palmitic fat.

9 Claims, No Drawings

FOOD COMPOSITION

This invention relates to confectionery fat, fat suitable for replacing part of the cocoabutter fat customarily used in chocolate compositions and in particular relates to bloom-resistant fat compositions for this purpose.

The high cost of cocoabutter has persuaded many confectionery manufacturers to include in their products vegetable butters that possess more or less high cocoabutter tolerance, at least over limited ranges of proportions. A variety of naturally-occurring vegetable butters and their fractions have been adopted for the purpose, including such fats as illipe, shea and products with similar physical characteristics from other, often related botanical sources. These are themselves often expensive to obtain and attempts have been made to obtain cocoabutter substitutes by hardening cheaper vegetable fats which being commonly liquid at ambient temperatures are usually referred to as oils. The hardening operation is effected by limited, usually selective hydrogenation, leaving monounsaturated fatty acid residues in the triglyceride molecules of the hardened oil.

Palm oil mid-fractions have also been developed which closely resemble cocoabutter itself, being similar also in containing large amounts, above 50%, of symmetrical dipalmityl oleyl glyceride, compared with the symmetrical disaturated mono-unsaturated glycerides present in cocoabutter and largely responsible for its excellent eating qualities.

Confectionery fats should exhibit a slip melting point between 30° and 45° C and dilatations at 20° C of at least 1000 eg 1800. Chocolate fats require additionally a melting point below 40° C and $D_{20} > 1400$.

It has now been found that superior confectionery fats are obtained comprising a blend of selectively-hardened palmitic and non-palmitic $C_{16}$-$C_{18}$ fats as hereinafter defined from different vegetable fat sources, the confectionery fat exhibiting a slip melting point of 30° to 45° C, a dilatation at 20° C of 1000 to 1800 and a trans index in excess of 25.

By palmitic fats we mean those containing from about 10 to about 40%, preferably 20 to 40%, of disaturated glycerides, at least two-thirds of the saturated acid residues of which are palmitic acid residues. The non-palmitic fat contains less than the palmitic fat, in any event not more than 20% of these disaturated glycerides.

Preferably also the non-palmitic component contains less than 30% saturated acid residues and has a melting point below 30° C together with a dilatation at 20° C of not more than 400.

The disaturated glyceride composition of the fats used in the preparation of the blends according to the invention can be obtained by carbon number analysis effected by temperatureprogrammed GLC methods, as developed by Carter-Litchfield (Fette-Seifen Anstr. 75 (4), 223-32 (1973). Lipase hydrolysis is also a valuable method of analysis that can be used, as is thin-layer chromatography developed on silica-supported silver nitrate followed by fatty acid analysis of the individual glycerides separated. From these methods of analysis, which may be used in combination, an estimation can be obtained of all disaturated glycerides present in the composition examined. To conform with the above-stipulated requirements, the total disaturated glyceride content must not only fall within the range specified, but unless two-thirds or more of the saturated fatty acids of the disaturated glycerides are palmitic, then the requirements are not met.

Both glyceride components may be obtained from vegetable oils themselves or from fractions thereof, blending, fractionation and hydrogenation being carried out in any order.

Both oils are hardened selectively to provide good compatibility and match with cocoabutter and should for this reason have a trans index, as methylelaidate, (J. Am. oil Chem. Soc. (1959) 36 627–31), of over 25%, preferably 30 to 60%, especially 30 to 40%. The hydrogenation being selective is therefore incomplete, leaving an appreciable degree of monounsaturation as reflected in an Iodine Value of at least 40 in the product and minimises formation of stearic acid residues. No precise upper limit can be given, as the object of the hydrogenation is to provide hard fats and these may be obtained with various Iodine Values, depending on the source fat and course of hydrogenation. In general however the Iodine Value of the hardened oil and the blend should lie between 40 and 90. preferably between 55 and 80. The hardening conditions should nevertheless leave the product with the requisite trans index. In addition, as a rough guide, the trans index numerically is preferably more than two-thirds, generally more than half, of the Iodine Value as measured by the Wijs method. Optimum Iodine Values include 70 to 77 for soyabean oil and 73 to 77 for groundnut oil.

Selective hydrogenation is carried out in the presence of a metal catalyst, generally nickel, which has been treated with sulphur to render it selective in hydrogenation activity and retain in the glycerides hydrogenated a single olefinic bond in each unsaturated fatty acid residue. A substantial proportion of these are however converted from the cis to the trans form during the operation by this class of catalyst.

The palmitic component of the blends according to the invention may be obtained from whose vegetable oils, preferably conttonseed or palm oil, but preferably comprise lower-melting fractions obtained from these oils. Fractionation for the purpose of providing either of the components may be effected by the dry method or by so-called Lanza fractionation, or by solvent-fractionation preferably using acetone as the solvent. Preferably palm oil is fractionated from acetone to yield an oleine fraction as the palmitic component of the blends, with an Iodine Value above 55, especially within the range 55 to 80.

Preferably the palmitic glycerides which are selectively hardened contain more than 20% of combined palmitic acid.

Suitable hydrogenated palm oleines for use as the palmitic components of the blends are described in British Patent No. 859,769, in which there also appears a description of a suitable method for measuring dilatation values, to which reference is made in this specification. Slip melting points referred to in this specification are measured in accordance with British Standard 684, 1958, page 14.

It is surprising, in view of the experience already established in blending fats for confectionery purposes, that good confectionery fat can be obtained by the blends of hardened palmitic and non-palmitic fats defined. In many cases blends of different fats provide eutectic, low-melting compositions unsuitable for many confectionery purposes. In its widest ramifications the invention provides an unexpected improvement in the characteristics of the non-palmitic component by blending it with a palmitic component.

A particularly important advantage of the invention is in the marked bloom-inhibiting qualities of those blends of the invention containing more palmitic than non-palmitic fat components which have melting characteristics suitable for chocolate fats. Bloom is an undesirable phenomenon occurring in chocolate confectionery which is confused by lay consumers with mould. It commonly occurs in most products containing hardened vegetable oil and less than 30% cocoabutter in the total fat phase. Where the hardened vegetable oil is replaced by the blends of the invention containing 50-90% of the hardened palmitic fat the products exhibit remarkable resistance to blooming.

The present invention also provides a method of preparing the above-described blends in which the palmitic and nonpalmitic glycerides are separately selectively hydrogenated and then blended together. Any fractionation which is carried out may be effected at any stage, but blends in suitable proportions of separately hydrogenated components have the further advantage that they exhibit significant improvement compared with either hydrogenated component or their hydrogenated blend. The improvement is represented by the dilatations at 20° C and 35° C, the difference between the two values indicating steepness of melting, and melting point, all of which are markedly improved. Thus, a higher $D_{30}$ may be obtained, consistent with a melting point at body temperature or a high $D_{30}$ maintained while lowering the melting point.

The precise proportions which give the best effects for particular purposes may be found by experiment but generally speaking both for marked bloom-resistance and significant improvement in the dilatation/temperature curve, there should be more palmitic than non-palmitic component present, preferably a 2:1 weight ratio approximately, although the ratio may vary from 3:1 to 5:4, preferably 5:2 to 3:2 for blends of hardened palm oleine and sobyabean oil.

The magnitude of the benefits in melting characteristics may appear small but they occur in regions which are critical for greater consumer appeal.

Additional fat and other components may be present in minor amounts in the compositions of the invention to provide improved qualities, flavours or colouring, if these are needed. They must not however interfere with the special mutual response of the principal fats on one another, the explanation for which is not yet fully understood.

EXAMPLE 1

Neutral Malayan palm oil of IV 53 was crystallised in a water-jacketed vessel with gentle stirring. The temperature of the oil was reduced in stages to about 28° C and this temperature was maintained until crystallisation was complete. The resulting slurry was then filtered to give a palm stearine of IV about 43 and slip melting point 48° C. The filtrate, obtained in about 65% yield, had an IV of about 60 and a disaturated glyceride content of about 40% with a palmitic acid content of about 37%. Stearic acid was about 6%. It was neutralised with aqueous alkali, washed, dried and filtered, prior to hydrogenation in a Parr (R.T.M.) laboratory autoclave. The hydrogenation was carried out at 175°-185° C, in the presence of 1% of a sulphur-poisoned nickel catalyst supported on kieselguhr, and which contained about 18% nickel, and 6% sulphur as a proportion of the nickel. The hydrogen pressure was maintained at 20 p.s.i. above atmospheric during the course of the reaction. Samples were withdrawn at stages, and had the characteristics shown by samples 1a to 1f in Table 1, samples 1b, 1d and 1e being blends of the others. All samples had trans values above 25.

TABLE I

| Sample | I.V. | Slip m.pt. ° C | $D_{20}$ | $D_{30}$ | $D_{35}$ | $D_{40}$ |
|---|---|---|---|---|---|---|
| 1a | 59.1 | 36.7 | 930 | 420 | 180 | 5 |
| 1b | 58 | | 1065 | | 265 | |
| 1c | 56.9 | 38.6 | 1200 | 655 | 355 | 40 |
| 1d | 56.6 | | 1255 | | 405 | |
| 1e | 55.9 | | 1365 | | 510 | |
| 1f | 55.3 | 41.0 | 1480 | 955 | 610 | 165 |
| 1g | 65.6 | 37.9 | 1160 | 635 | 320 | 5 |
| 1h | 64.9 | 38.3 | 1200 | 680 | 355 | 5 |
| 1i | 64.5 | 38.6 | 1270 | 740 | 390 | 20 |

In a second experiment 30% of neutral soyabean oil was added to the dry-fractionated palm oleine, and this blend hydrogenated in the same manner. As before, samples 1g to 1i were withdrawn, and these had the properties shown in Table I and trans values above 25.

It can be seen that, within experimental error, samples g, h and i do not differ significantly from corresponding samples from the series a to f with regard to the steepness of melting, as evidenced by $D_{20}$–$D_{35}$ differences for example.

EXAMPLE 2

(Showing the effect of blending previously hardened oils)

Soyabean oil was hydrogenated by the method described in Example 1 to give two samples 2a and 2b, with properties shown in Table II (trans values 60 and 58). These two hydrogenated oils were then blended with samples of hardened palm oleine from Example 1 in the ratio 30:70 of hardened soyabean oil to hardened palm oleine, giving fats with the characteristics shown in Table II.

TABLE II

| Sample | Composition | | I.V. | Slip m.pt. ° C | $D_{20}$ | $D_{30}$ | $D_{35}$ | $D_{40}$ |
|---|---|---|---|---|---|---|---|---|
| 2a | Hydrogenated Soyabean Oil | | 79.7 | 37.0 | 1330 | 520 | 160 | 5 |
| 2b | | | 75.1 | 39.6 | 1560 | 835 | 380 | 95 |
| | Soyabean; | Palm | | | | | | |
| 2c | 2b | 1b | 63.0 | 37.1 | 1120 | 495 | 195 | 10 |
| 2d | 2a | 1c | 63.2 | 37.4 | 1165 | 515 | 205 | 5 |
| 2e | 2b | 1d | — | — | 1285 | 650 | 275 | 0 |
| 2f | 2a | 1e | — | — | 1215 | 580 | 250 | 5 |

In all cases the ($D_{20}$–$D_{35}$) value is greater than that of the corresponding blends in Example 1. Where, also, corresponding samples have similar $D_{20}$ values, the $D_{35}$ value in this Example is lower. Even though the blends may appear less steeply-melting than 2a and 2b they promote less bloom and contain a high amount of the cheaper palmitic fat. Palmitic fats also have better flavour stability than hydrogenated soyabean oil. The blends are also more compatible with cocoabutter.

EXAMPLE 3

Crude Malayan palm oil was solvent-fractionated to give a palm mid-fraction for use in chocolate fats in accordance with the process described in British Pat. No. 827,172. The oleine fraction recovered in about 60% yield had an IV of 66 and an FFA (free fatty acid)

of 6%. It contained about 34% disaturated glycerides, and total saturated fatty acids 39% including 33% palmitic acid. It was neutralised, dried and filtered, and then hydrogenated by the method described in Example 1 to give sample 3a, with an IV 54 and trans index 41. This was blended with sample 2b to give the range of compositions shown in Table III.

TABLE III

| Sample Composition | | Dilatations of Blend | | | | |
|---|---|---|---|---|---|---|
| Palm 3a wt. % | Soyabean 2b wt. % | $D_{20}$ | $D_{25}$ | $D_{30}$ | $D_{35}$ | $D_{40}$ |
| 100 | 0 | 1435 | 1190 | 770 | 320 | 0 |
| 90 | 10 | 1450 | 1195 | 770 | 290 | 5 |
| 80 | 20 | 1440 | 1190 | 765 | 270 | 20 |
| 70 | 30 | 1475 | 1205 | 745 | 240 | 25 |
| 60 | 40 | 1495 | 1210 | 755 | 245 | 25 |
| 50 | 50 | 1460 | 1195 | 750 | 255 | 10 |
| 40 | 60 | 1480 | 1215 | 765 | 285 | 35 |
| 30 | 70 | 1460 | 1210 | 770 | 295 | 40 |
| 20 | 80 | 1475 | 1220 | 785 | 320 | 55 |
| 10 | 90 | 1505 | 1245 | 810 | 345 | 75 |
| 0 | 100 | 1510 | 1265 | 825 | 365 | 90 |

At a 30–40% inclusion of hardened soyabean oil there is a simultaneous increase in the dilatation values at 20 to 25° C and a decrease in the dilatation values at higher temperatures, eg 35° C. Although this effect is numerically small it is important in the production of specialised fats as it gives sharper melting profiles as evidenced by an increased $D_{20}-D_{35}$ value. These compositions are generally suitable for chocolate couverture products.

EXAMPLE 4

Solvent-fractionated palm oleine prepared in accordance with British Pat. No. 827,172 as described in Example 3 was used. It was blended with an oleine fraction resulting from the fractionation of shea oil in accordance with British Pat. No. 925,805, the blend ratio being 85:15. This material was hydrogenated to give a crude hydrogenation sample 4a (trans index 42) and a refined sample 4b obtained by standard refinery techniques. Neutral soyabean oil was hydrogenated to give a sample 4c (trans index 55). These hardened fats were blended in 70:30 and 60:40 ratio, the palm oleine being in excess, to give samples 4d and 4e respectively. The properties of these fats were given in Table IV.

Samples 4d and 4e are improvements on sample 4b.

TABLE IV

| Sample | Composition | I.V. | Slip m.pt. °C | $D_{20}$ | $D_{30}$ | $D_{35}$ | $D_{40}$ |
|---|---|---|---|---|---|---|---|
| 4a | Hydrog. mixed oleine | 57.3 | 36.8 | 1505 | 840 | 330 | 5 |
| 4b | Hydrog. mixed oleine | 56.9 | 36.9 | 1520 | 785 | 325 | 5 |
| 4c | Hydrog. mixed soyabean oil | 74.6 | 36.8 | 1515 | 775 | 255 | 20 |
| 4c repeat | Hydrog. mixed soyabean oil | 73.0 | 36.6 | 1485 | 760 | 230 | 0 |
| 4d | 70% b + 30% c | 62.5 | 35.8 | 1485 | 790 | 235 | 10 |
| 4e | 60% b + 40% c | 63.8 | 35.5 | 1470 | 780 | 210 | 5 |

Samples of the compositions prepared in accordance with the invention as described in Examples 3 and 4 were used in the preparation of chocolate couverture compositions. All the samples showed satisfactory compatibility with cocoabutter and conferred good characteristics, including bloom resistance, to the compositions.

EXAMPLE 5

Various oils were hydrogenated selectively to give two hydrogenated samples from each, under trans-promoting conditions, including 1% of a sulphur-poisoned supported nickel catalyst containing about 18% nickel and about 6% sulphur based on the nickel. Each oil provided two samples differing slightly in Iodine Value. The oils were cottonseed, IV 112, disaturated glyceride content 17%, total saturated fatty acid content 26%, including 20% palmitic acid, soyabean IV 131.5 and palm oleine, IV 58.9. The latter was obtained by dry fractionation at 28° C.

A blend was also prepared of the palm oleine with soyabean oil and hydrogenated under similar conditions, to show the effect of hydrogenation after blending. Further particulars of the blends of hydrogenated oils obtained appears in Table V.

TABLE V

| Hydrogenated oil | I.V. | Slip m.pt. °C | $D_{20}$ | $D_{30}$ | $D_{35}$ | $D_{40}$ | $D_{20}-D_{35}$ |
|---|---|---|---|---|---|---|---|
| 1) Cottonseed (a) | 73.4 | 35.7 | 1210 | 515 | 130 | 5 | 1080 |
| 2) Cottonseed (b) | 72.1 | 36.9 | 1195 | 590 | 195 | 0 | 1000 |
| 3) Soyabean (a) | 76.7 | 34.8 | 1295 | 520 | 80 | 10 | 1215 |
| 4) Soyabean (b) | 73.0 | 34.9 | 1345 | 590 | 135 | 10 | 1210 |
| 5) Palm oleine (a) | 50.5 | 39.3 | 1280 | 755 | 480 | 180 | 800 |
| 6) Palm oleine (b) | 49.7 | 39.7 | 1260 | 720 | 450 | 90 | 810 |
| 7) 30% (3) 70% (1) | 74.0 | 34.1 | 1240 | 480 | 95 | 20 | 1145 |
| 8) 30% (2) 70% (5) | 55.6 | 39.0 | 1195 | 660 | 335 | 70 | 860 |
| 9) 35% (4) 65% (6) | 58.5 | 36.2 | 1200 | 560 | 270 | 0 | 930 |
| 10) (30% soyabean) (70% palm oleine) | 64.3 | 38.2 | 1185 | 640 | 335 | 10 | 850 |

The hydrogenated blend (10) shows a clearly inferior dilatation profile, represented by the ($D_{20}$ minus $D_{35}$) values, compared with the preceding blend (9) in the Table, the preparation of which was otherwise very similar. Where hydrogenation procedes blending the properties of the resulting blends correspond roughly to the weighted average of the blend components.

EXAMPLE 6

Groundnut oil of IV 89.2 was neutralised and hydrogenated by the procedure described in the preceding Example.

Crude palm oil was dissolved in dry acetone at about 40° C and the solution cooled to about 0° C. Crystals separated from the solution, and these were removed by filtration and washed with further quantities of dry acetone at 0° C. The mother liquor and wash acetone were combined and evaporated to give a liquid palm oil fraction of slip melting point 18° C and IV 65. This was neutralised and hydrogenated as described in Example 5, as was a dry-fractionated palm oleine.

The properties of these products and of blends of the hydrogenated groundnut oil with the hydrogenated palm oleines are shown in Table VI.

TABLE VI

| Hydrogenated oil | I.V. | Slip m.pt. °C | $D_{20}$ | $D_{25}$ | $D_{30}$ | $D_{35}$ | $D_{40}$ | $D_{20}-D_{35}$ |
|---|---|---|---|---|---|---|---|---|
| 1) Groundnut | 69.2 | 32.5 | 1180 | 755 | 295 | 20 | 10 | 1160 |
| 2) df palm oleine | 50.0 | 39.2 | 1215 | 1015 | 720 | 430 | 115 | 785 |
| 3) wf palm oleine | 55.6 | 38.4 | 1640 | 1490 | 1080 | 590 | 40 | 1050 |
| 4) 40% (1) 60% (2) | 57.8 | 35.6 | 1085 | 770 | 430 | 165 | 10 | 920 |
| 5) 30% (1) 70% (2) | 57.5 | 36.3 | 1055 | 785 | 435 | 180 | 0 | 875 |
| 6) 40% (1) 60% (3) | 60.9 | 34.9 | 1405 | 1145 | 645 | 155 | 10 | 1250 |
| 7) 30% (1) 70% (3) | 58.7 | 36.0 | 1475 | 1240 | 760 | 250 | 10 | 1225 |

The results confirm that the properties of blends of separately hydrogenated fats in accordance with the invention are at least equal to the weighted average of the properties of the components. The increased values in the ($D_{20}-D_{35}$) column of the blends of separately hydrogenated groundnut oil and wet-fractionated palm oleine show that the blends have higher values than either of the components and are superior to the blends containing dry-fractionated palm oleine. These blends are useful in toffee production and in other applications of the Food Trade.

EXAMPLES 7

Blends of selectively hydrogenated soyabean and wetfractionated palm oils, hydrogenated as described in Example 5, were evaluated in chocolate bars prepared from a recipe containing 21% cocoa powder (10/12), 45% icing sugar and 34% parts of the fat blend. An initial series of moulding tests was carried out to ascertain the moulding conditions for gloss, appearance and de-moulding behaviour and establish the optimum moulding temperature, 110° F, at which bars were then moulded and given storage trials at a fixed temperature of 68° F and at ambient, varying from 55° to 68° F.

It was found that blends containing 50% upwards of the palmitic fat remained free from bloom even after storage for 5 weeks and with 65% upwards, for over 10 weeks.

In Table VII a disaturated glyceride content is given for various oils, as a guide for their use in the blends of the invention. In most cases the value quoted represents dipalmityl glycerides only, but for those asterisked the figure is that for total disaturated glycerides, ie of both palmitic and stearic acids.

TABLE VII

| Oil Component | Lowest Level | Probable Mean Level | Highest Level |
|---|---|---|---|
| Whole Palm Oil | 34 | 44 | 54* |
| Palm[1] Top Fraction (IV 10) | ca. 15 | 23 | 40 |
| Mid Fraction (IV 35) | 71 | 80% | 90 |
| Oleine (IV 65) | 29% | 34% | 38% |
| Dry F. Palm Oleine (IV ca. 56) | | ca. 40 | |
| Lanza F. Palm Oleine (IV ca. 58) | | ca. 37 | |
| Cottonseed Oil | | 16.5 | 20* |
| Winterised Cottonseed Oil | | ca. 10 | |
| Shea Oleine[2] (IV ca. 70) | | ca. 5% | 10* |
| Safflower Oil | | 5* | |
| Fraction of H. Cottonseed | | ca. 45* | |
| Soyabean Oil | 5 | 8* | 10* |
| Olive Oil | | 5 | |
| Groundnut Oil | | 10* | |
| Sunflower Oil | | 4* | |
| Maize Oil | | 8* | |
| Sesame Oil | | 7* | |

[1]Acetone-fractionated in accordance with BP 827,172.
[2]Acetone-fractionated in accordance with BP 925,805.

What is claimed is:

1. Method of preparing a confectionery fat comprising selectively hydrogenating and blending first and second fats from different vegetable fat source, the first fat being a vegetable fat containing 10 to 40% by weight of disaturated glycerides of which two-thirds of the saturated fatty acids are palmitic acid and the second vegetable fat containing a lesser amount of such glycerides not exceeding 20%, the fats being blended in an amount of from 50 to 90% by weight of the first fat to 10 to 50% by weight of the second fat and selectively hydrogenated in the presence of a metl catalyst while retaining in the glycerides hydrogenated a single olefinic bond in each unsaturated fatty acid residue to provide a blend with a trans index of about 25, of an Iodine Value of 40 to 90 and a dilatation at 20° C of 1000 to 1800.

2. Method according to claim 1, wherein the said vegetable fats are separately hydrogenated.

3. Confectionery prepared fat by the process of claim 2

4. Method according to claim 1, wherein said first fat comprises a lower melting fraction of palm oil and said second fat comprises a polyunsaturated vegetable oil.

5. Method according to claim 1, wherein said second fat contains less than 30% saturated fatty acid residues and has a melting point below 30° C and a dilatation at 20° C of not more than 400.

6. Method according to claim 1, wherein said first said second fats are hydrogenated using a sulfided nickel catalyst.

7. Confectionery fat prepared by the process of claim 1.

8. Confectionery fat prepared by the process of claim 1 said first fat hard fat comprises an oleine fraction of palm oil with an Iodine Value from 50 to 80.

9. Method of preparing a confectionery fat having improved melting and bloom-resistant properties, the process comprising the steps of:

a. Preparing a first fat having 10 to 40% disaturated glycerides, at least two-thirds of the saturated fatty acid moieties of which are of palmitic acid, by fractionating palm or cottonseed oil to recover a low-melting fraction;

b. Preparing a second fat containing a lesser amount, not mote than 20%, of said glycerides, from a liquid vegetable oil;

c. Blending said first and second fats in proportions from 50 to 90 : 50 to 10% by weight of the first to second fats, and d. Selectively hydrogenating said first and second fats in the presence of a sulfided nickel selective hydrogenated catalyst and thereafter e. Recovering a selective hydrogenated fat having a trans index of at least 25%, a slip melting point of 30° to 45° C iodine value at least 40 and a dilatation at 20° C of 1000 to 1800.

* * * * *